3,087,374
OPTICAL MASER ELEMENTS
George E. Devlin, South Plainfield, and Arthur L. Schawlow, Madison, N.J., assignors to Bell Telephone Laboratories, Incorporated, New York, N.Y., a corporation of New York
Filed July 3, 1961, Ser. No. 121,409
14 Claims. (Cl. 88—1)

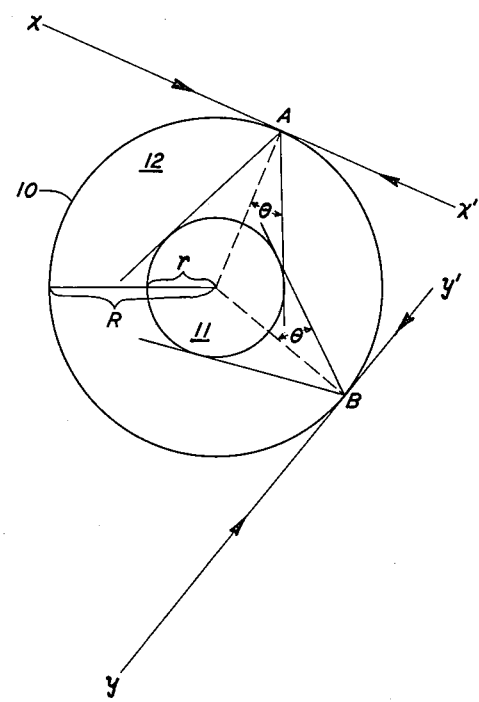

This invention relates to optical masers. More particularly, it relates to optical maser elements having a novel construction and geometric configuration so as to provide more efficient utilization of the pumping radiation and additionally result in faster heat dissipation from the active maser medium.

Optical masers as are now established in the art are adapted to generate coherent electromagnetic radiation in the light frequency range. Light energy radiation defines the electromagnetic spectrum from ultraviolet to the farthest infra-red. This encompasses a general wavelength range of from 100 angstroms to $2 \times 10^6$ angstroms.

A representative optical maser device constructed according to presently established techniques is disclosed in U.S. Patent 2,929,922, granted March 22, 1960. This patent discloses the use of an active maser material in the form of a rod. This form is the geometry of optical maser cavities now generally encountered in the art. Various crystal compositions and forms adapted for use as negative temperature mediums in solid-state optical masers are described in Electronics, May 5, 1961, pages 88–91. While to date rod-shaped cavities have achieved general acceptance, this invention is also well suited to other cavity designs, specifically spherical or wafer-shaped cavities as described in application Serial No. 64,885, filed October 25, 1960.

Solid-state optical masers currently in operation require intense pumping radiation to achieve the overpopulation of high energy states necessary to achieve the maser condition. This radiation represents essentially the total power required to operate an optical maser system. Successful attempts to reduce the required pumping power as, for instance, by efficient utilization of the radiation incident on the active crystal medium, represent direct and significant reductions in power requirements for the device.

An additional problem of vital concern with prior art devices is the dissipation of heat from the active maser element. Attempts to operate solid state optical masers on a continuous basis have met with little success due primarily to the intense heat generated in the active maser crystal.

This invention is essentially an improvement over prior art solid-state optical maser cavity designs. In its broadest sense it includes additional structure supplemental to the cavity itself designed to promote more efficient pumping of the active maser element and to additionally provide an efficient rate of heat dissipation from the active negative temperature medium.

According to the constructions of the present invention, each of these results may be obtained with the use of a specially designed composite maser element. This composite element includes the active maser medium having a rod shaped or spherical design and a shell structure surrounding the curved portions of the active medium. If the exterior shell portion is composed of a material transparent to the pumping radiation and having a relatively high refractive index, the pumping radiation incident on the surface of the outer shell will be focused or concentrated on the interior active maser medium, thus providing a uniform, high-intensity distribution of pump energy throughout the maser medium. This outer medium additionally serves as an effective heat sink so as to provide efficient heat dissipation from the active portion of the composite maser element. Accordingly, the outer shell portion is most desirably constructed of a heat conductive material.

This invention may perhaps be more easily understood when considered in conjunction with the drawing in which the FIGURE is a schematic illustration including a cross-section of a composite maser structure of circular cross-section showing by simple ray optics theory an essential aspect of this invention.

The figure shows, in cross-section, a composite maser element 10. This element is constructed of an interior active maser rod or sphere 11 which is composed of a conventional negative temperature medium, for instance ruby, and an exterior shell which comprises any material having the requisite physical properties as will be hereinafter more thoroughly treated. Consider a randomly-selected point such as point A on the outer surface of the shell 12. From simple ray optics theory, all pumping radiation entering the element at point A from an external source (not shown) will possess an incident angle within a semi-phere generated about point A having a plane boundary defined by rays $x$ and $x'$ rotationally projected about point A.

The identical relationship is illustrated at point B with rays $y$ and $y'$. Assuming a higher refractive index for the shell 12 than for the surrounding environment, these rays, upon entering the shell 12, will be refracted such that they fall within a cone having a half-angle $\theta$. The size of the cone within the shell 12 is related to the refractive index of the shell by Snell's law which, assuming the environment is air for which $n=1$, becomes:

$$\sin \theta = \frac{1}{n} \qquad (1)$$

where $\theta$ is the half angle of the cone and $n$ is the refractive index of the shell. Thus, upon integrating the points such as A and B around the entire periphery of the shell portion 12, the radiation pattern in the medium 10 defines an interior portion 11 which represents a zone of uniform radiation density of a maximum intensity. The radius of the interior zone will always be related to the radius of the composite element by the refractive index of the portion 12 in the following manner:

$$n = \frac{R}{r} \qquad (2)$$

where $n$ is the refractive index of the material, R is the radius of the overall composite element, and $r$ is the radius of the inner zone of concentrated radiation intensity. It is apparent that $r$ may be less than prescribed by this formula with the active medium still within the high intensity region.

From the foregoing it is apparent to those skilled in the art that this invention is applicable only to the situations where the refractive index of the shell 12 is greater than that of the surrounding environment (assumed to be one in the above derivation). For the general case, Equation 2 becomes:

$$\frac{n}{n'} = \frac{R}{r} \quad (3)$$

where $n$ is the refractive index of the shell 12 and $n'$ is the refractive index of the surrounding environment. For the purposes of this invention, to obtain a desired degree of concentration of radiation, the ratio $n/n'$ should be a minimum of 1.3 and preferably be at least 1.6.

It is further apparent that in the above treatment significant variations between the refractive index of the outer medium 12 and the inner active maser portion 11 have been ignored. Where the refractive index of the portion 11 is significantly below that of the surrounding medium 12, non-uniformities in energy density distribution across the active medium occur, and losses due to reflection at the interface between the active portion 11 and the medium 12 becomes significant. Accordingly, for this invention the index of refraction of the medium 12 is preferably at least 95% of the refractive index of the active negative temperature medium 11.

A preferred form of this invention is a composite crystal maser element essentially composed of a single crystal body and in which the composition of the active maser portion and the inert surrounding shell are essentially the same except that the active portion of the body is doped with a small amount of an appropriate phosphor which with the designated post lattice is capable of providing a negative temperature. Examples of this form of this invention are given in the following table:

Table I

| Inactive material | Active material | Ratio R/r (for $n'=1$) |
| --- | --- | --- |
| $Al_2O_3$ (sapphire) | $Al_2O_3 + Cr^{3+}$ (0.005 to 1.0%) | 1.76 |
| $CaF_2$ | $CaF_2 + Sm^{3+}$ (.01%) | 1.43 |
| $CaF_2$ | $CaF_2 + Eu^{2+}$ (.05%) | 1.43 |
| $CaF_2$ | $CaF_2 + Tb^{3+}$ (.05%) | 1.43 |
| $CaF_2$ | $CaF_2 + U^{3+}$ (.05%) | 1.43 |

Note—Percents are mol percents.

As previously pointed out the ratio $R/r$ corresponds essentially to the ratio of the refractive indices of the maser element and the surrounding medium. For the usual rod shaped cavities this ratio correlates the relative diameters of the composite rod. As applied to spherical cavities this ratio is simply the radius of the overall spherical composite element as related to the radius of the active sphere.

Various methods for growing single crystal elements having the composition and dimensions prescribed in Table I will be apparent to those skilled in the art. One specific technique for obtaining single crystals is to use a seed crystal of the active composition and grow the outer shell. A flux growing procedure adapted for this particular technique is described in application Serial No. 31,356, filed May 24, 1960.

In constructing elements according to the more general form of this invention the outer medium will be a material other than the active maser medium chosen to provide a desirable refractive index and the desired degree of heat dissipation. This medium may be either fluid or solid. It is obvious that if a circulating fluid is employed, it is then unnecessary that the fluid possess a high heat conductivity coefficient. However, the fluid should nevertheless have a favorable index of refraction, for example, in excess of 1.3 and have a high effective heat conductivity. If a solid medium is used it preferably possesses a heat conductivity coefficient at least as high as the active medium. In this way the outer medium provides for effective dissipation of heat generated in the active portion of the element.

Various appropriate compositions for the composite element according to the more general form of this invention are given in the following table:

Table II

| Active element | Inactive medium | R/r ($n'=1$) |
| --- | --- | --- |
| (May be any of those listed in Table I) | Ge[1] | 4 |
| | $ZnO_2$ | 2.2 |
| | $TiO_2$ | 2.4 |
| | $SnO_2$ | 2.0 |
| | $ZnTe$ | 3.56 |
| | $ZnSO_4$ | 2.0 |

[1] Transparent only to infra-red pump energy.

In every embodiment according to this invention, it is necessary that the element be constructed of materials providing relative indices of refraction within the limits previously prescribed. It is also essential that the geometry of the boundary of the outer medium be essentially the same and concentric with the boundary of the active portion of the elements; that is, the element must be essentially a composite of concentric rods or concentric spheres.

It is understood that optical masers according to this invention may operate at any frequency within the light frequency range previously prescribed. The frequency of the pumping radiation is generally also within this range. Thus it is a requirement of the medium surrounding the negative temperature material that it be essentially transparent to radiation of some frequency within the light energy spectrum which corresponds to the pump frequency.

Various additional extensions and modifications of this invention will become apparent to those skilled in the art. All such variations and deviations, which basically rely on those concepts and teachings by which this invention has advanced the art are considered within the scope of this invention as defined in the appended claims.

What is claimed is:

1. A composite optical maser element comprising a first medium consisting essentially of a negative temperature material, said first medium having a spherical geometry, and a second medium essentially surrounding the curved portions of the surface of the said first medium, the outer surface of said second medium having a geometry essentially matching that of the first medium and concentric therewith, said second medium comprising an in active, light transparent material having a refractive index value of at least 95 percent of the refractive index value of the said first medium and a heat conductivity at least approximately equal to that of the said first medium.

2. The element of claim 1 wherein the refractive index of said second medium is at least 1.3.

3. The element of claim 1 wherein the second medium is a solid medium.

4. The element of claim 3 wherein the said second medium comprises the crystalline material forming the host lattice for the maser material.

5. The element of claim 4 wherein the said first and second mediums comprise a single crystal body.

6. The element of claim 1 wherein the ratio of the diameter of the second medium to the diameter of the first medium is approximately the same as the ratio of the refractive index of the second medium to the refractive index of the environment surrounding the second medium.

7. The element of claim 3 wherein the refractive index of the said second medium is at least 1.6.

8. The element of claim 1 wherein the said first medium consists essentially of ruby.

9. The element of claim 8 wherein the second medium comprises sapphire and said first and second mediums comprise a single crystal.

10. A composite optical maser element comprising a first medium consisting essentially of a negative temperature material, said first medium having a cylindrical geometry, and a second medium essentially surrounding the curved portions of the surface of the said first medium, the outer surface of said second medium having a geometry essentially matching that of the first medium and concentric therewith, said second medium comprising an inactive light transparent material having a refractive index value of at least 95 percent of the refractive index value of the said first medium and a heat conductivity at least approximately equal to that of the said first medium.

11. The element of claim 10 wherein the refractive index of said second medium is at least 1.3.

12. The element of claim 10 wherein the second medium is a solid medium.

13. The element of claim 10 wherein the ratio of the diameter of the second medium to the diameter of the first medium is approximately the same as the ratio of the refractive index of the second medium to the refractive index of the environment surrounding the second medium.

14. The element of claim 10 wherein the said first medium consists essentially of ruby.

No references cited.